United States Patent
Carl, Jr. et al.

(10) Patent No.: US 7,573,168 B2
(45) Date of Patent: Aug. 11, 2009

(54) METHOD AND APPARATUS FOR ASSEMBLING A PERMANENT MAGNET POLE ASSEMBLY

(75) Inventors: Ralph James Carl, Jr., Clifton Park, NY (US); Bharat Sampathkumaran Bagepalli, Niskayuna, NY (US); Patrick Lee Jansen, Scotia, NY (US); Richard Nils Dawson, Voorheesville, NY (US); Ronghai Qu, Clifton Park, NY (US); Mikhail Avramovich Avanesov, Moscow (RU)

(73) Assignee: General Electric Company, Niskayuna, NY (US)

( * ) Notice: Subject to any disclaimer, the term of this patent is extended or adjusted under 35 U.S.C. 154(b) by 420 days.

(21) Appl. No.: 11/256,718

(22) Filed: Oct. 24, 2005

(65) Prior Publication Data
US 2007/0090711 A1    Apr. 26, 2007

(51) Int. Cl.
*H02K 1/28* (2006.01)
*H02K 1/24* (2006.01)
*H02K 21/12* (2006.01)

(52) U.S. Cl. ............... 310/156.08; 310/156.13; 310/156.19; 310/156.48; 310/156.51; 310/218

(58) Field of Classification Search ........... 310/156.08, 310/156.12, 156.13, 156.19, 156.48, 156.49, 310/156.51, 156.52, 156.63, 156.65, 156.78, 310/156.79, 216–218
See application file for complete search history.

(56) References Cited

U.S. PATENT DOCUMENTS

| | | | | | |
|---|---|---|---|---|---|
| 1,976,230 | A | * | 10/1934 | Kato et al. | 252/62.56 |
| 2,485,474 | A | * | 10/1949 | Brainard | 310/156.51 |
| 4,126,933 | A | * | 11/1978 | Anderson et al. | 29/598 |
| 4,139,790 | A | * | 2/1979 | Steen | 310/156.83 |
| 4,393,320 | A | * | 7/1983 | Anderson | 310/156.77 |
| 4,506,181 | A | * | 3/1985 | Jones et al. | 310/156.78 |
| 4,510,680 | A | * | 4/1985 | Miller et al. | 29/598 |
| 4,525,925 | A | * | 7/1985 | Jones | 29/598 |
| 4,769,624 | A | | 9/1988 | Merritt et al. | |
| 4,795,936 | A | * | 1/1989 | Crosetto et al. | 310/156.53 |
| 4,916,346 | A | | 4/1990 | Kliman | |
| 4,918,831 | A | | 4/1990 | Kliman | |
| 4,942,324 | A | * | 7/1990 | Ooyama et al. | 310/216 |
| 5,691,589 | A | | 11/1997 | Keim et al. | |
| 5,701,047 | A | | 12/1997 | Johnson | |
| 5,894,183 | A | * | 4/1999 | Borchert | 310/261 |
| 5,952,755 | A | | 9/1999 | Lubas | |

(Continued)

FOREIGN PATENT DOCUMENTS

EP    1420501    5/2004

OTHER PUBLICATIONS

Co-Pending U.S. Appl. No. 10/951,335, filed Sep. 27, 2004, Entitled: "Electrical Machine With Double-Sided Stator".

(Continued)

*Primary Examiner*—Burton Mullins
(74) *Attorney, Agent, or Firm*—Ann M. Agosti

(57) ABSTRACT

A pole assembly for a rotor, the pole assembly includes a permanent magnet pole including at least one permanent magnet block, a plurality of laminations including a pole cap mechanically coupled to the pole, and a plurality of laminations including a base plate mechanically coupled to the pole.

6 Claims, 7 Drawing Sheets

U.S. PATENT DOCUMENTS

| | | |
|---|---|---|
| 6,467,150 B1 | 10/2002 | Tanaka |
| 6,509,664 B2 * | 1/2003 | Shah et al. .................. 310/181 |
| 6,920,683 B2 | 7/2005 | Tanaka |
| 6,967,420 B2 | 11/2005 | Laurent et al. |
| 6,984,908 B2 | 1/2006 | Rinholm et al. |
| 7,154,191 B2 * | 12/2006 | Jansen et al. .................. 290/55 |
| 7,154,192 B2 * | 12/2006 | Jansen et al. .................. 290/55 |
| 7,154,193 B2 * | 12/2006 | Jansen et al. .................. 290/55 |
| 2004/0263006 A1 | 12/2004 | Iwase et al. |
| 2004/0263012 A1 | 12/2004 | Dommsch et al. |
| 2006/0131985 A1 * | 6/2006 | Qu et al. ..................... 310/266 |

OTHER PUBLICATIONS

Co-Pending U.S. Appl. No. 10/951,329, filed Sep. 27, 2004, Entitled: "Electrical Machine With Double-Sided Lamination Stack".

Co-Pending U.S. Appl. No. 10/882,911, filed Jun. 30, 2004, Entitled: "Electrical Machine With Double-Sided Rotor".

Co-Pending U.S. Appl. No. 11/014,137, filed Dec. 16, 2004, Entitled: "Electrical Machines and Assemblies Including a Yokeless Stator With Modular Lamination Stacks".

* cited by examiner

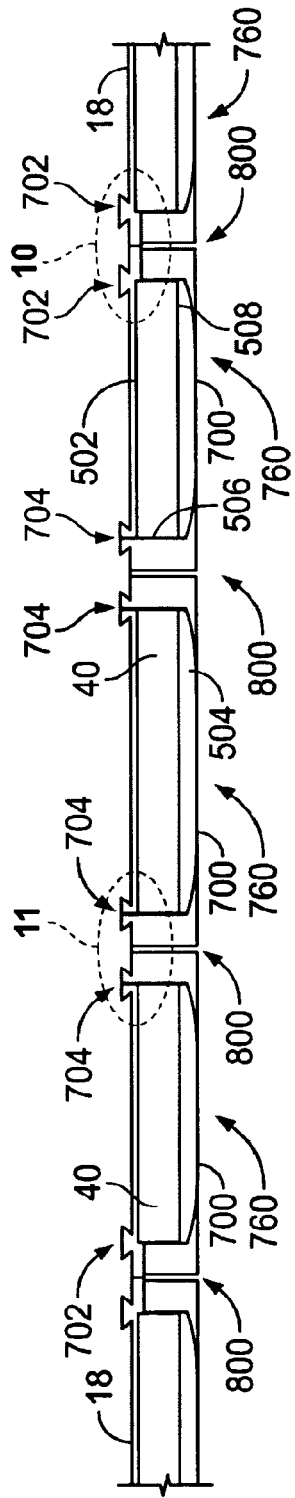
FIG. 9
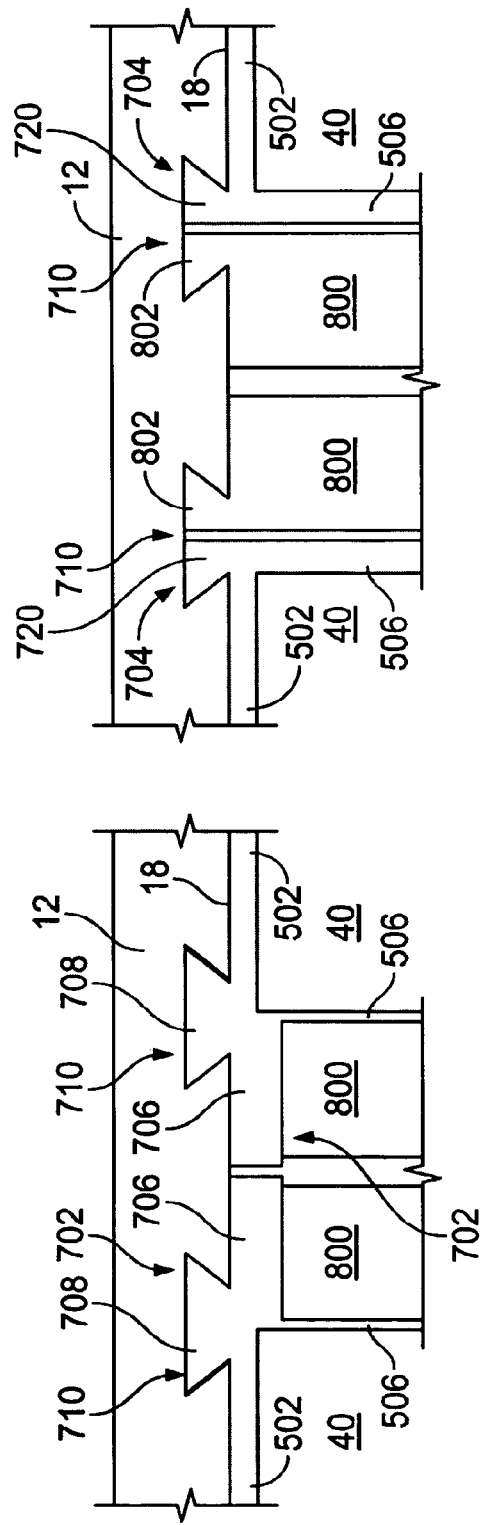
FIG. 11
FIG. 10

US 7,573,168 B2

METHOD AND APPARATUS FOR ASSEMBLING A PERMANENT MAGNET POLE ASSEMBLY

This invention was made with Government support under Subcontract ZAM-4-31235-05 awarded by NREL and under Prime contract DE-AC36-99-GO10337 awarded by U.S. Department of Energy. The government has certain rights in the invention.

BACKGROUND OF THE INVENTION

This invention relates generally to permanent magnet machines, and more particularly, methods and apparatus for assembling a permanent magnet pole assembly for an electric machine.

At least some known high-torque, low-speed permanent magnet machines used with electric utility class wind generators and other applications include large diameter rotors having a diameter greater than one meter. Such rotors generally include many magnet poles. Known magnet poles are assembled from multiple magnetic blocks that are secured to the rotor. However, such designs generally do not adequately address magnet pole design issues including rotor losses, demagnetization protection, pole shaping, pole assembly, permanent magnet block capture, magnetized pole handling and/or pole mounting of a magnetized pole.

With respect to rotor losses, at least some known brushless AC synchronous permanent magnet machines may include necessary, but undesirable non-synchronous air gap flux caused by harmonics and/or sub-harmonics in the armature reaction, or by slotting. This non-synchronous flux induces eddy current loss in electrically conducting components of the rotor. Stators constructed with fractional slot windings e.g., 2/5 or 2/7 slots per pole per phase, are particularly problematic in creating non-synchronous air-gap flux, and resulting rotor losses. To facilitate preventing such rotor losses, at least some known machines utilize bonded magnets, which include magnetic powder embedded in a polymeric binder. However, the residual induction of bonded magnets is generally very low, especially for high torque machines.

Several methods of attaching magnet poles are known for example, some rotors secure the magnets to the rotor of an interior rotor machine using a fiberglass hoop that is wet wound around the magnets. On at least some rotors the magnets are held to the motor by shrunk fit metallic hoops. With this approach, the magnets are typically magnetized after they are coupled to the rotor, before the rotor is positioned relative to the stator. Other known magnet poles are magnetized prior to being inserted into an air gap defined between the pre-assembled rotor and stator. Such poles are then secured in place with separate clamping pieces. However, because the clamps are separate pieces from the magnet pole, the clamping process may be time-consuming.

BRIEF DESCRIPTION OF THE INVENTION

In one aspect, a pole assembly for a rotor is provided. The pole assembly includes a permanent magnet pole including at least one permanent magnet block, a plurality of laminations including a pole cap mechanically coupled to the pole, and a plurality of laminations including a base plate mechanically coupled to the pole.

In another aspect, a method for assembling a pole assembly for a rotor is provided. The method includes coupling a plurality of clamping bars to the rotor and coupling a plurality of base plate laminations to the rotor. The method also includes coupling a plurality of pole cap laminations to the clamping bars such that a cavity is defined between the plurality of base plate laminations and the plurality of pole cap laminations and inserting a plurality of permanent magnet blocks into the cavity.

In a further aspect, an electric machine is provided. The machine includes a stator assembly and a rotor assembly rotatably coupled with the stator assembly. The stator assembly and the rotor assembly are separated from one another by an air gap. The rotor assembly includes a plurality pole assemblies, each pole assembly includes a plurality unitary pole laminations. The pole laminations include a laminated base plate portion, a laminated pole cap portion, and a laminated bridge portion extending therebetween such that a cavity is formed between the laminated base plate portion and the laminated pole cap portion. The pole assembly also includes a permanent magnet pole including a plurality of sintered magnet blocks coupled within the cavity such that the pole is enclosed with the plurality of pole laminations and a coupling member configured to secure the pole assembly to the rotor assembly.

BRIEF DESCRIPTION OF THE DRAWINGS

FIG. 9 is side view of a portion of a rotor core including a fourth embodiment of permanent magnet pole assembly;

FIG. 10 is an enlarged view of portion of the rotor core shown in FIG. 9 and taken along Area 10; and FIG. 11 is an enlarged view of a portion of the rotor core shown in FIG. 9 and taken along Area 11.

DETAILED DESCRIPTION OF THE INVENTION

The present invention is directed to permanent magnet (PM) pole assemblies for use with high pole count electric machines that are particularly useful for low speed drives, such as direct-drive multi-megawatt wind generators and ship propulsion motors. While the invention is described and illustrated in the context of a radial flux, synchronous electrical machine, the invention is not limited to such electrical machines. The embodiments set forth herein are therefore exemplary only and represents various embodiments of the invention, but are not conclusive of all embodiments. As explained below, these embodiments contribute towards reducing rotor eddy current losses, cogging torque, and ripple torque, in electric machines, as well as, facilitating the protection of such against de-magnetization machines, while also providing a means to secure the pole to the rotor rim. The attachment means is such that the pole pieces, in either a magnetized or un-magnetized state, can be individually inserted and extracted from the air gap by sliding the pole axially.

Figure 1:
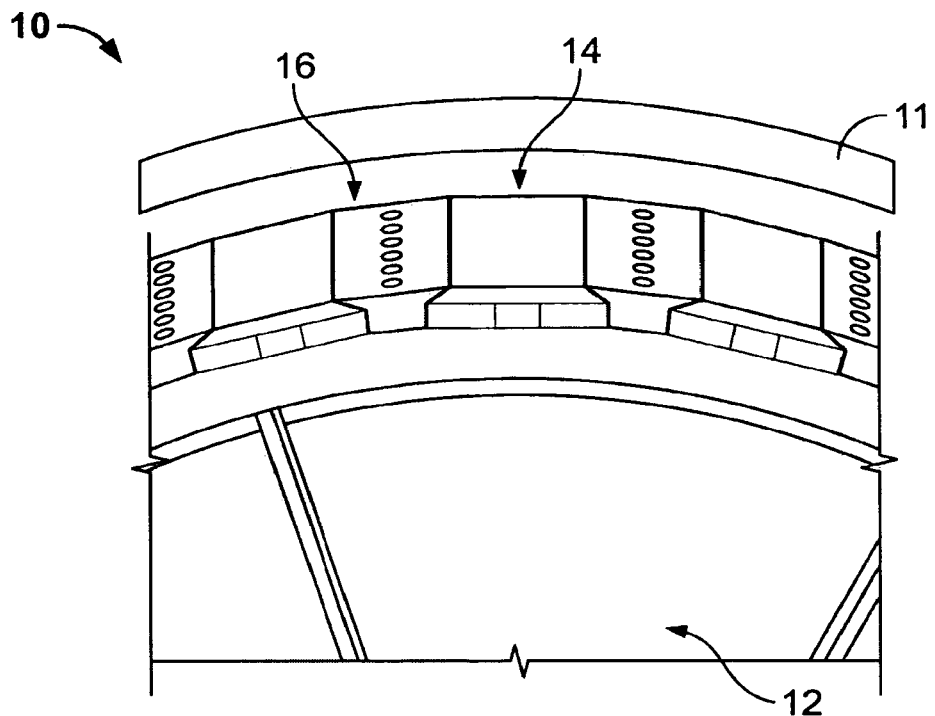
FIG. 1 is a prospective view of an exemplary permanent magnet rotor.
Figure 2:
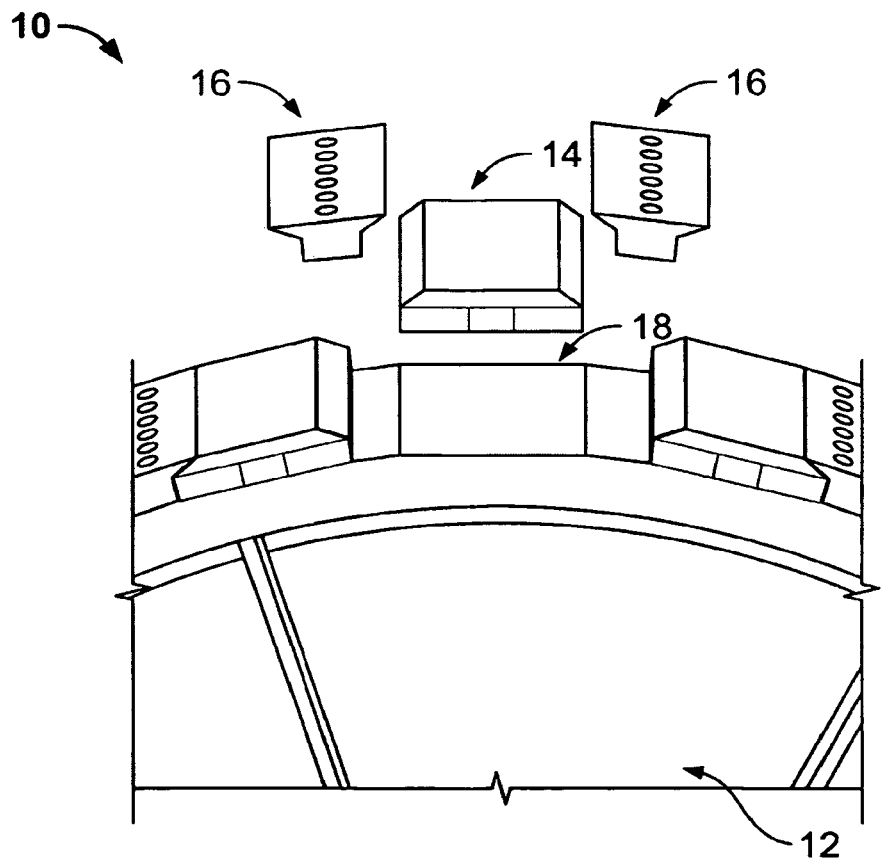
FIG. 2 is an exploded prospective view of the exemplary permanent magnet rotor shown in FIG. 1 including a first embodiment of a permanent magnet pole assembly.
Figure 3:
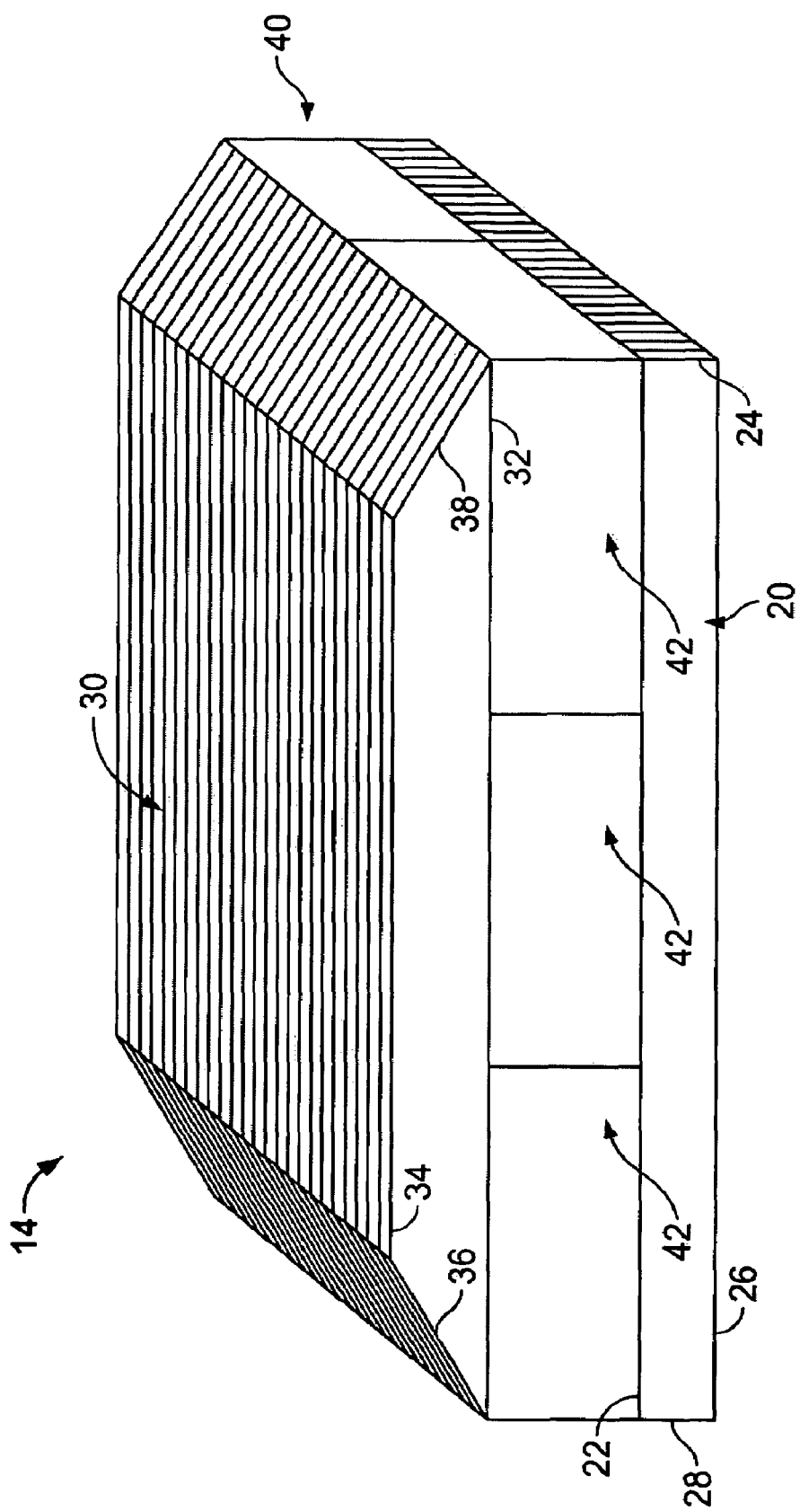
FIG. 3 is a prospective view of the first embodiment of the permanent magnet pole assembly.

FIG. 1 is a prospective view of an exemplary permanent magnet rotor assembly 10 for an electrical machine (not shown) including a rotor 12 and a plurality of permanent magnet pole assemblies 14 coupled to rotor 12 by a plurality of retaining clamps 16. FIG. 2 is an exploded prospective view of rotor assembly 10 including pole assembly 14, a plurality of retaining clamps 16, and a rotor rim 18. FIG. 3 is a prospective view of a first embodiment of permanent magnet pole assembly 14. In the exemplary embodiment, pole assembly 14 includes a plurality of base plate laminations 20, plurality of pole caps laminations 30, and a permanent magnet pole 40 mechanically coupled therebetween. Base plates 20, pole caps 30, and pole 40 are bonded together with a bonding agent that is impregnated between all the components.

Base plate laminations 20 are configured to facilitate reducing eddy current losses. In the exemplary embodiment, each base plate lamination 20 is substantially rectangular in shape. In alternative embodiments, each base plate lamination 20 may have any other shape, such as, but not limited to, an arcuate shape or a trapezoidal shape. Specifically, in the exemplary embodiment, each base plate lamination 20 is contoured with a shape that substantially matches a contour of stator rim (not shown). In the exemplary embodiment, base plate laminations 20 are fabricated from a laminated ferromagnetic material. In alternative embodiments, base plate laminations 20 may be fabricated from any other suitable material, such as a soft magnetic composite material, that enables pole assembly 14 to function as described herein.

Each base plate lamination 20 includes a first sidewall 22, a second sidewall 24, a third sidewall 26, and a fourth sidewall 28. In the exemplary embodiment, second sidewall 24 and fourth sidewall 28 are substantially parallel to one another. As such, in the exemplary embodiment, first and third sidewalls 22 and 26 respectively are substantially perpendicular to second and fourth sidewalls 24 and 28.

Pole cap laminations 30 are shaped to facilitate minimizing cogging torque and to facilitate protecting permanent magnet pole 40 from demagnetizing fields under abnormal conditions. In the exemplary embodiment, each pole cap lamination 30 is substantially trapezoidal in shape. In alternative embodiments, each pole lamination 30 may have any other shape, such as, but not limited to, a rectangular shape or an arcuate shape. Specifically, each pole cap lamination 30 has a contour that substantially matches a contour of stator rim (not shown). In the exemplary embodiment, each pole cap lamination 30 is fabricated from an electrical steel material. In alternative embodiments, pole cap laminations 30 may be fabricated from any other suitable material that enables pole assembly 14 to function as described herein.

Each pole cap lamination 30 includes a first sidewall 32 and a second sidewall 34, first and second sidewalls 32 and 34 respectively are substantially parallel. In the exemplary embodiment, each pole cap lamination 30 includes a first tapered portion 36 extending from sidewall 34 towards sidewall 32 and a second tapered portion 38 extending from sidewall 34 towards sidewall 32.

Permanent magnet pole 40 includes permanent magnet blocks 42 which are coupled between base plate laminations 20 and pole cap laminations 30. PM pole 40 includes a plurality of magnet blocks 42 that do not extend the length of the pole assembly 14, but rather includes a plurality of magnet blocks 42 stacked together to achieve a desired length of pole assembly 14.

In the exemplary embodiment, each permanent magnet block 42 is substantially rectangular in shape. In alternative embodiments, permanent magnet block 42 may have any other shape, such as, but not limited to, a square shape or a trapezoidal shape. Specifically, each PM pole 40 has a contour that substantially matches a contour of both base plate sidewall 22 and pole cap sidewall 32. In the exemplary embodiment, each PM pole 40 is fabricated from six sintered block magnets 42 and coated with an electrically-isolating epoxy. In alternative embodiments, PM pole 40 may be fabricated from any other suitable block magnets and coated with any other suitable epoxy that enables pole assembly 14 to function as described herein.

During assembly, in one embodiment, pole assembly 14 is magnetized and then mounted on to rotor 12 being coupled to a stator (not shown). In an alternative embodiment, pole assembly 14 is coupled to rotor 12, magnetized, and the resulting magnetized pole assembly 14 then coupled to the stator.

Figure 4:
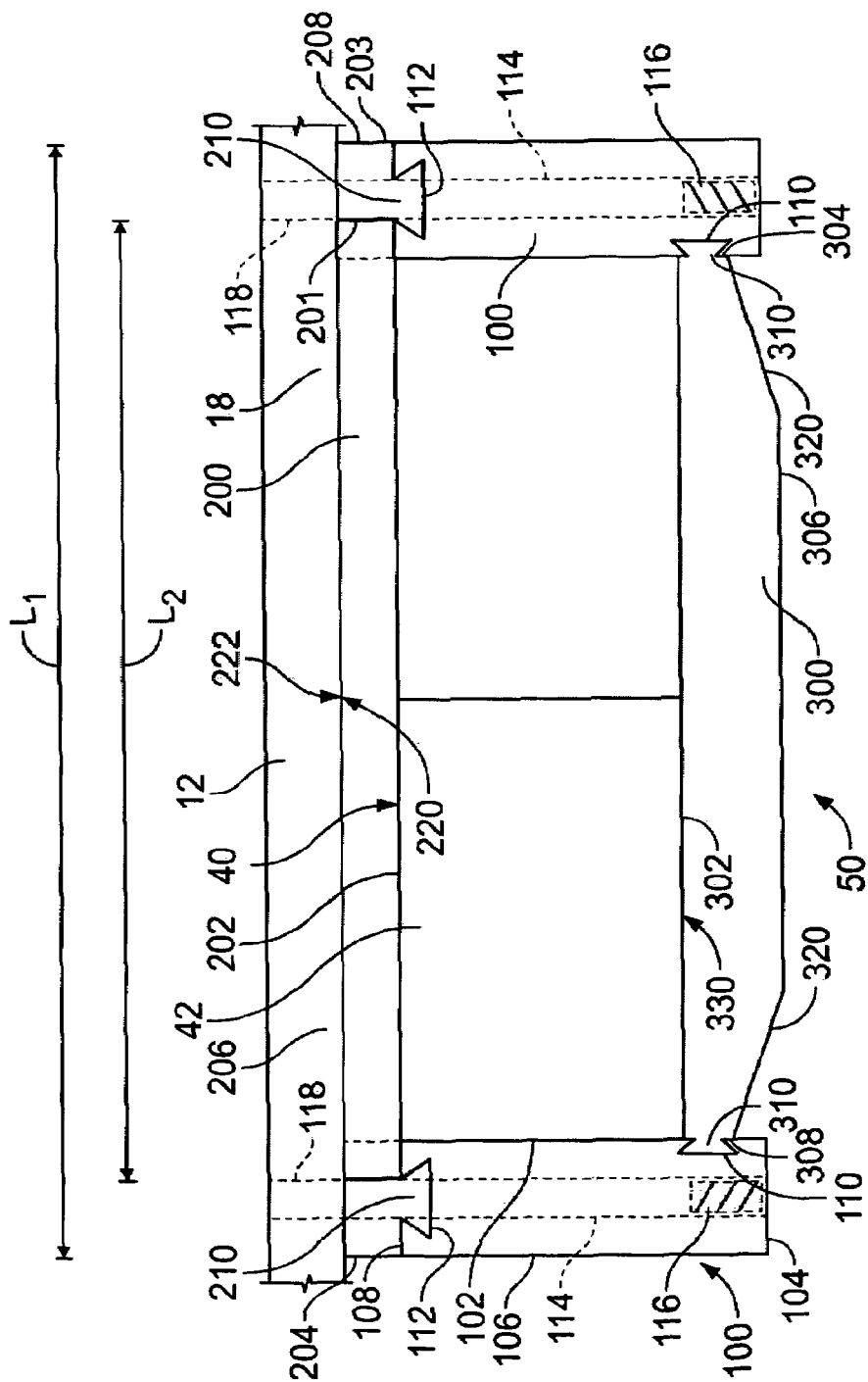
FIG. 4 is a cross-sectional view of a second embodiment of permanent magnet pole assembly.

FIG. 4 is a cross-sectional view of a second embodiment of pole assembly 50. Permanent magnet pole assembly 50 is substantially similar to pole assembly 14, (shown in FIG. 3) and components of pole assembly 50 that are identical to components of pole assembly 14 are identified in FIG. 4 using the same reference numerals used in FIG. 3.

In the exemplary embodiment, pole assembly 50 includes a pair of clamping bars 100 which are mechanically coupled to a plurality of base plate laminations 200, a plurality of pole cap laminations 300, and a permanent magnet pole 40. Clamping bars 100, base plate laminations 200, pole cap laminations 300, and permanent magnet pole 40 are bonded together with a bonding agent that is impregnated between all the components.

Base plate laminations 200 are configured to facilitate reducing eddy current losses. In the exemplary embodiment, each base plate lamination 200 is substantially rectangular in shape. In alternative embodiments, each base plate lamination 200 may have any other shape, such as, but not limited to, an arcuate shape or a trapezoidal shape. Specifically, in the exemplary embodiment, each base plate lamination 200 is contoured with a shape that substantially matches a contour of stator rim (not shown). In the exemplary embodiment, base plate laminations 200 are fabricated from a laminated ferromagnetic material. In alternative embodiments, base plate laminations 200 may be fabricated from any other suitable material, such as a soft magnetic composite material, that enables pole assembly 50 to function as described herein.

Base plate laminations 200 include both truncated base plate laminations 201 and full-length base plate laminations 203. Full-length base plate laminations 203 couple axially between adjacent clamping bars 100 between mounting apertures 114. Truncated base plate laminations 201 extend axially between clamping bars 100 and are adjacent each mounting aperture 114. In the exemplary embodiment, full-length base plate laminations 203 have a length $L_1$ and truncated base plate laminations 201 have a length $L_2$, wherein $L_1$ is greater than $L_2$.

Each base plate lamination 200 includes a first sidewall 202, a second sidewall 204, a third sidewall 206, and a fourth sidewall 208. In the exemplary embodiment, second sidewall 204 and fourth sidewall 208 are substantially parallel to one another. As such, in the exemplary embodiment, first sidewall 202 is substantially perpendicular to second and fourth sidewalls 204 and 208. In the exemplary embodiment, each sidewall 202 includes a pair dovetails 210 extending substantially perpendicular from sidewall 202. Each dovetail 210 extends across substantially a full width of sidewall 202. Dovetails 210 slidably couple into dovetails slots 112 to facilitate securing each base plate lamination 200 upon one another within clamping bar 100 until a desired length of pole assembly 50 is achieved.

In the exemplary embodiment, each sidewall 206 includes a channel 220 extending partially therethrough and extending substantially across a full width of sidewall 206. Channel 220 receives a weld bead 222 therein. During assembly, after the last base plate 200 is inserted within pole assembly, weld bead 222 is applied axially along an entire length of pole assembly 50 within channel 220.

Pole cap laminations 300 are shaped to facilitate minimizing cogging torque and to facilitate protecting PM blocks 40 from demagnetizing fields under abnormal conditions. In the exemplary embodiment, each pole cap lamination 300 is substantially trapezoidal in shape. In alternative embodiments, each pole cap lamination 300 may have any other shape, such as, but not limited to, a rectangular shape or an arcuate shape. Specifically, each pole cap lamination 300 has a contour that substantially matches a contour of stator rim (not shown). In the exemplary embodiment, each pole cap lamination 300 is fabricated from an electrical steel material. In alternative embodiments, pole cap lamination 300 may be fabricated from any other suitable material that enables pole assembly 50 to function as described herein.

Each pole cap lamination 300 includes a first sidewall 302, a second sidewall 304, a third sidewall 306, and a fourth sidewall 308. First and third sidewalls 302 and 306 respectively are substantially parallel, and second and fourth sidewalls 304 and 308 respectively are substantially parallel. Accordingly, in the exemplary embodiment, sidewalls 302 and 306 are substantially perpendicular to sidewalls 304 and 308. Moreover, in the exemplary embodiment, each sidewall 306 includes a tapered portion 320 extending from sidewall 306 towards sidewalls 304 and 308, respectively.

In the exemplary embodiment, sidewalls 304 and 308 each include a dovetail 310 extending substantially perpendicularly from sidewall 304. Each dovetail 310 extends substantially across a full width of sidewalls 304 and 308, respectively. Dovetails 310 slidably couple with dovetails slots 110 such that each pole cap lamination 300 is stacked upon one another within clamping bar 100 until a desired length of pole assembly 50 is achieved. As pole cap laminations 300 are stacked together a cavity 330 is defined by clamping bar sidewalls 102, base plate sidewalls 202, and pole cap sidewalls 302. Cavity 330 extends substantially across a full length of pole assembly 50. In the exemplary embodiment, cavity 330 is substantially rectangular in shape. In alternative embodiments, cavity 330 may have any other shape, such as, but not limited to, a square shape or a trapezoidal shape.

Permanent magnet pole 40 includes permanent magnet blocks 42 which are slidably coupled within pole assembly cavity 330. Permanent magnet pole 40 includes a plurality of magnet blocks 42 that do not extend the length of the pole assembly 50, but rather includes a plurality of magnet blocks 42 stacked together to achieve a desired length of pole assembly 50.

In the exemplary embodiment, each permanent magnet block 42 is substantially rectangular in shape. In alternative embodiments, permanent magnet block 42 may have any other shape, such as, but not limited to, a square shape or a trapezoidal shape. Specifically, each pole 40 has a contour that substantially matches a contour of cavity 330. In the exemplary embodiment, each PM pole 40 is fabricated from two sintered magnet blocks 42 and coated with an electrically-isolating epoxy. In alternative embodiments, PM pole 40 may be fabricated from any other suitable magnet blocks and coated with any other suitable epoxy that enables pole assembly 50 to function as described herein.

During assembly, each pole 40 is inserted into pole assembly cavity 330 until pole 40 is a desired length and weld bead 222 applied. After weld bead 222 is applied, pole assembly 50 is subjected to a vacuum to enable pole assembly 50 to be impregnated with a material. In one embodiment, pole assembly 50 is fabricated from a conventional vacuum pressure impregnation resin such as, but not limited to an epoxy, a polyester, and an acrylic resin. Pole assembly 50 is then powder coated with a material such as, but not limited to, an epoxy and an epoxy-polyester. In one embodiment, pole assembly 50 is magnetized and then mounted on to rotor core 18 prior to being coupled to the stator. In an alternative embodiment, pole assembly 50 is coupled to rotor core 18, magnetized, and the resulting magnetized pole assembly 50 then coupled to the stator.

Figure 5:
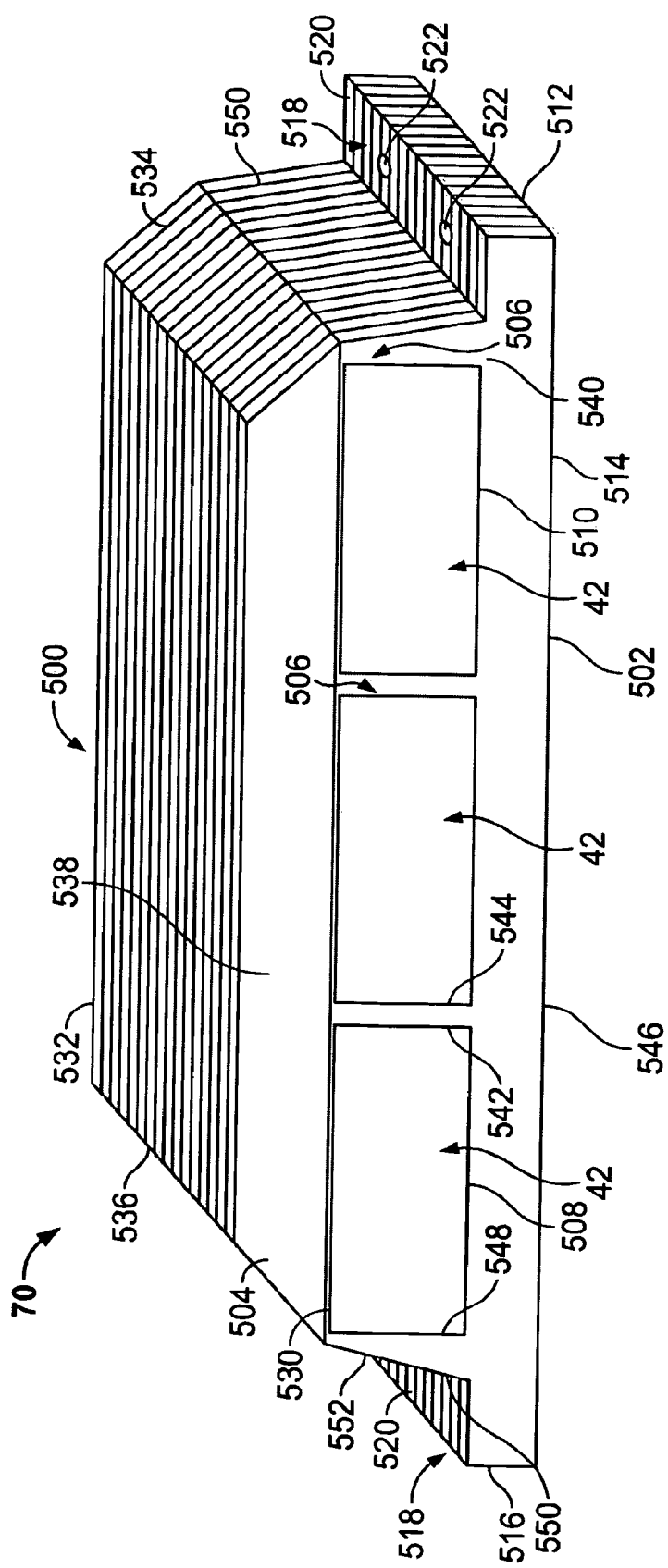
FIG. 5 is a prospective view of a third embodiment of permanent magnet pole assembly.

FIG. 5 is a cross-sectional view of a third embodiment of a permanent magnet pole assembly 70. Permanent magnet pole assembly 70 is substantially similar to pole assembly 50, (shown in FIG. 4) and components of pole assembly 70 that are identical to components of pole assembly 50 are identified in FIG. 5 using the same reference numerals used in FIG. 4.

In the exemplary embodiment, pole assembly 70 includes a plurality of laminations 500 that are each sized to receive at least one permanent magnet pole 40 including permanent magnet blocks 42 therethrough. Moreover, laminations 500 are configured to facilitate reducing eddy current losses, facilitate minimizing cogging torque, and facilitate shielding pole assembly 70 from demagnetizing fields under abnormal conditions. In the exemplary embodiment, each lamination 500 is substantially trapezoidal in shape. In alternative embodiments, laminations 500 may have any other shape, such as, but not limited to, an arcuate shape or a rectangular shape. Specifically, each lamination 500 has a contour that substantially matches a contour of stator rim (not shown). In the exemplary embodiment, lamination 500 is fabricated from an electrical steel material. In alternative embodiments, laminations 500 may be fabricated from any other suitable material that enables pole assembly 70 to function as described herein.

Each lamination 500 includes a base plate portion 502, a pole cap portion 504, and a plurality of bridge portions 506 extending therebetween such that a cavity 508 is defined therein. In the exemplary embodiment, three cavities 508 are defined therein. In alternative embodiments, each lamination 500 may have any number of cavities 508 that enables pole assembly 70 to function as described herein. Each permanent magnet block 42 is sized to fit within a corresponding cavity 508.

In the exemplary embodiment, each base portion 502 includes a first sidewall 510, a second sidewall 512, a third sidewall 514, and a fourth sidewall 516. First and third sidewalls 510 and 514 respectively are substantially parallel to one another, and second and fourth sidewalls 512 and 516 respectively are substantially parallel to one another. Accordingly, in the exemplary embodiment, sidewalls 510 and 514 are substantially perpendicular to sidewalls 512 and 516. Moreover, in the exemplary embodiment, a lip portion 518 extends radially outward from each of sidewalls 512 and 516, respectively, such that a mounting surface 520 is formed. Laminations 500 positioned adjacent to rotor mounting apertures (not shown) have an aperture 522 sized to receive a fastener (not shown) therethrough.

In the exemplary embodiment, each pole cap portion 504 is substantially trapezoidal in shape. In alternative embodiments, pole cap portion 504 may have any other shape, such as, but not limited to, a rectangular shape or an arcuate shape. Specifically, each pole cap portion 504 has a contour that substantially matches a contour of stator rim (not shown).

In the exemplary embodiment, each pole cap portion 504 includes a first sidewall 530 and a second sidewall 532. First and second sidewalls 530 and 532 respectively are substantially parallel to one another. Moreover, in the exemplary embodiment, sidewall 532 has a first tapered portion 534 that extends from sidewall 532 towards sidewall 530 and a second tapered portion 536 that extends from sidewall 532 towards sidewall 530, respectively.

In the exemplary embodiment, bridge portions 506 include both rectangular bridge portions 538 and trapezoidal bridge portions 540. In the exemplary embodiment, each rectangular bridge portion 538 includes a first sidewall 542, a second sidewall 544, and a body 546 extending therebetween. First and second sidewalls 540 and 542 respectively are substantially parallel to one another. Body 544 is in mechanical communication with base plate sidewall 510 and pole cap sidewall 530. In the exemplary embodiment, each trapezoidal bridge portion 540 includes a sidewall 548, a shoulder portion 550, and a body 552 extending therebetween. Shoulder portion 550 is positioned adjacent to base plate lip 518. Body 552 is in mechanical communication with base plate sidewall 510 and pole cap sidewall 530.

Figure 6:
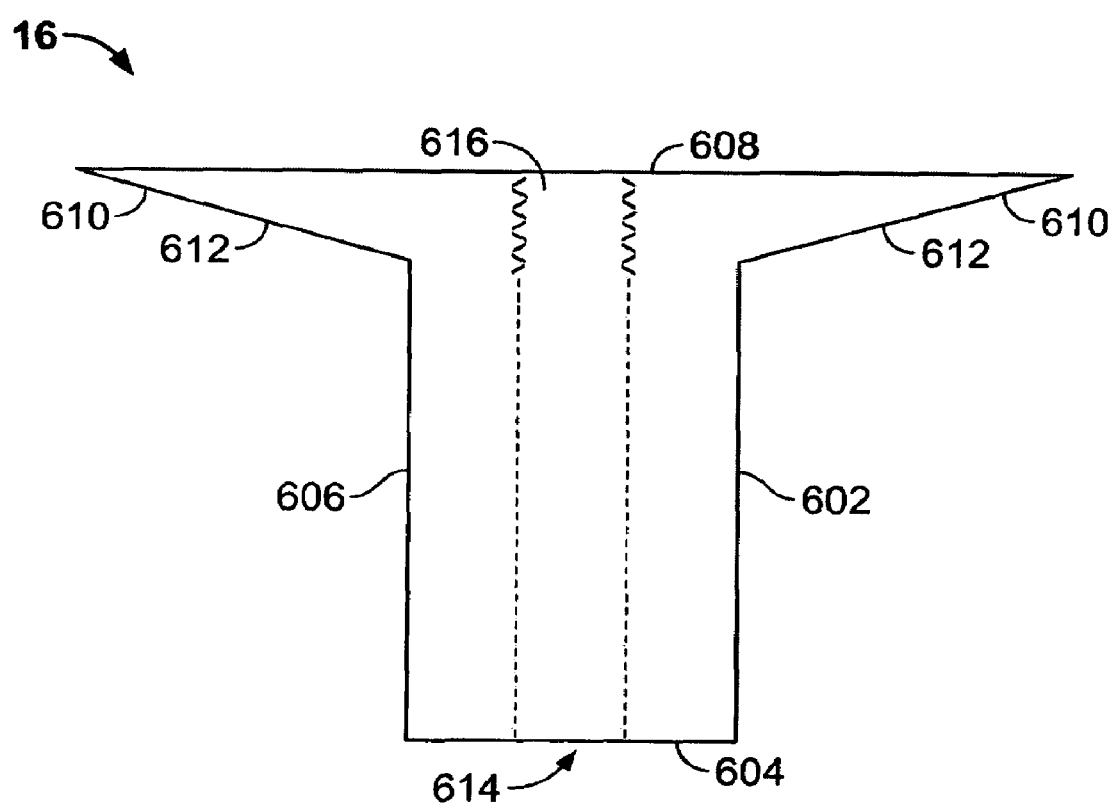
FIG. 6 is a cross-sectional view of an exemplary embodiment of a retaining clamp shown in FIG. 1.

FIG. 6 is a cross-sectional view of an exemplary embodiment of retaining clamp 16 configured to facilitate securing both pole assemblies 14 and 70 to rotor rim 18. In the exemplary embodiment, each clamp 16 is substantially rectangle in shape. In alternative embodiments, clamp 16 may have any other shape, such as, but not limited to, a square shape or a trapezoidal shape. Specifically, each clamp 16 is shaped to match a corresponding base plate lip, bridge shoulder, and/or pole cap tapered portion. In the exemplary embodiment, clamp 16 is fabricated from a non-magnetic material. In one embodiment, clamp 16 is fabricated from a fiberglass/resin composite, such as, but not limited to G10 and/or G11 materials. In another embodiment, clamp 16 is fabricated from a composite including, but not limited to, electrical steel and a G10 material. In alternative embodiments, clamp 16 may be fabricated from any other suitable material that enable pole assemblies 14 and 70 to function as described herein.

In the exemplary embodiment, each clamp 16 includes a first sidewall 602, a second sidewall 604, a third sidewall 606, and a fourth sidewall 608. First and third sidewalls 602 and 606 respectively are substantially parallel to one another, and second and fourth sidewalls 604 and 608 respectively are substantially parallel to one another. Accordingly, sidewalls 602 and 606 are substantially perpendicular to sidewalls 604 and 608. Moreover, in the exemplary embodiment, sidewalls 602 and 606 includes a tapered portion 610 that extends from sidewalls 602 and 606 respectively towards sidewall 608. In the exemplary embodiment, tapered portion 610 includes a tapered mounting surface 612.

Referring to FIGS. 2 and 3 and pole assembly 14, clamp sidewall 604 is configured to mechanically couple to rotor core 18 and clamp tapered portion 610 is configured to mechanically couple to pole cap tapered portions 36 and 38 such that pole assembly 14 is mechanically coupled to rotor 12. In the exemplary embodiment, a fastener (not shown) extends through a clamp aperture 614 and into threaded inserts 616 within clamps 16. In an alternative embodiment, the fastener extends through clamp apertures 614 into to a locking fastener (not shown) positioned with rotor core 18.

Referring to FIG. 5 and pole assembly 70, clamp sidewalls 602 and 606 are configured to mechanically couple to bridge shoulder portions 550, clamp sidewall 604 is configured to mechanically couple to base plate lip 518, and clamp tapered portion 610 is configured to mechanically couple to pole cap tapered portions 534 and 536 such that pole assembly 70 is mechanically coupled to rotor core 18. In the exemplary embodiment, a fastener (not shown) extends through clamp apertures 614 through base plate lip apertures 522, and into threaded inserts 616 within clamps 16. In an alternative embodiment, the fastener extends through clamp apertures 614 through lip apertures 522, and into to a locking fastener (not shown) positioned with in rotor core 18.

Figure 7:
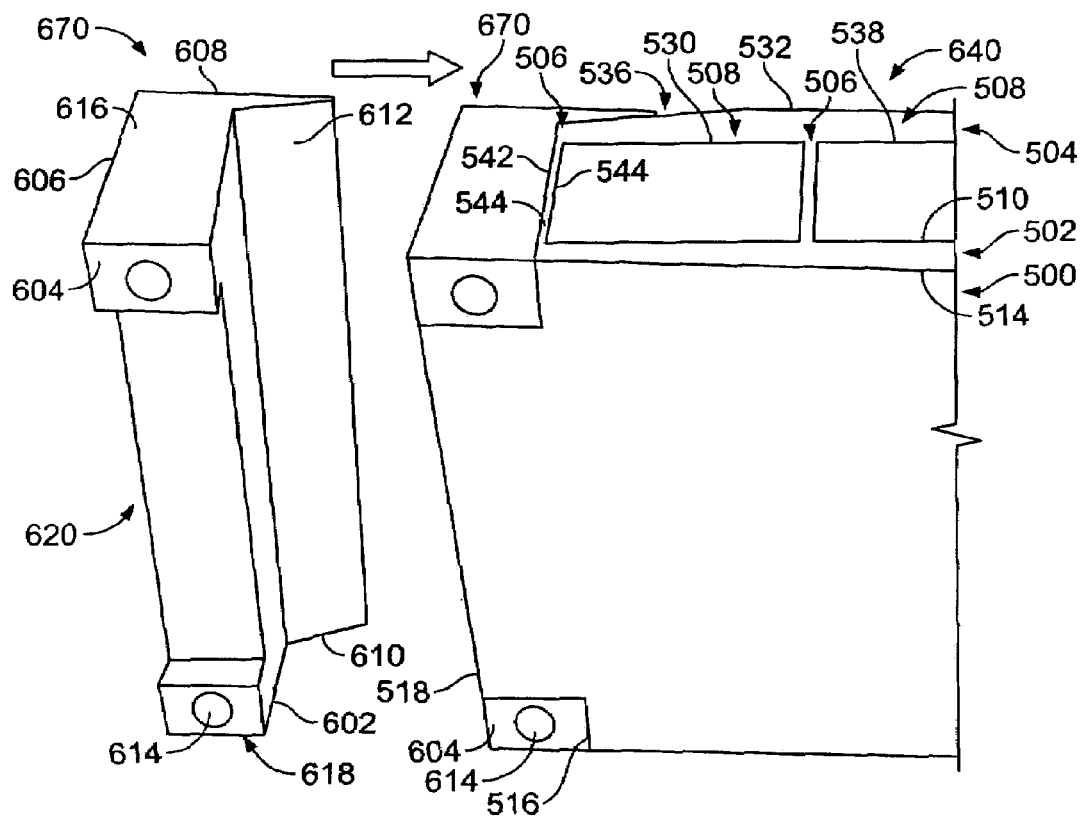
FIG. 7 is a prospective view of an exemplary embodiment of a fourth embodiment of permanent magnet pole assembly and an exploded view of a second embodiment of the retaining clamp shown in FIG. 6.

FIG. 7 is a prospective view of an exemplary embodiment of a fourth embodiment of permanent magnet pole assembly 640 and an exploded view of a second embodiment of retaining clamp 670 shown in FIG. 6. Permanent magnet pole assembly 640 is substantially similar to pole assembly 70, (shown in FIG. 5) and components of pole assembly 640 that are identical to components of pole assembly 70 are identified in FIG. 7 using the same reference numerals used in FIG. 5. Retaining clamp 670 is substantially similar to retaining clamp 16, (shown in FIG. 6) and components of retaining clamp 670 that are identical to components of retaining clamp 16 are identified in FIG. 7 using the same reference numerals used in FIG. 6.

In the exemplary embodiment, pole assembly 640 includes a plurality of laminations 500 that are each sized to receive at least one permanent magnet block 42 therethrough. Moreover, laminations 500 are configured to facilitate reducing eddy current losses, facilitate minimizing cogging torque, and facilitate shielding pole assembly 640 from demagnetizing fields under abnormal conditions. In the exemplary embodiment, each lamination 500 is substantially trapezoidal in shape. In alternative embodiments, laminations 500 may have any other shape, such as, but not limited to, an arcuate shape or a rectangular shape. Specifically, each lamination 500 has a contour that substantially matches a contour of stator rim (not shown). In the exemplary embodiment, lamination 500 is fabricated from an electrical steel material. In alternative embodiments, laminations 500 may be fabricated from any other suitable material that enables pole assembly 640 to function as described herein.

Each lamination 500 includes a base plate portion 502, a pole cap portion 504, and a plurality of bridge portions 506 extending therebetween such that a plurality of cavities 508 are defined therein. In the exemplary embodiment, two cavities 508 are defined therein. In alternative embodiments, each lamination 500 may have any number of cavities 508 that enables pole assembly 640 to function as described herein In the exemplary embodiment, each base portion 502 includes a first sidewall 510, a second sidewall (not shown in FIG. 7), a third sidewall 514, and a fourth sidewall 516. First and third sidewalls 510 and 514 respectively are substantially parallel to one another, and second and fourth sidewalls 516 are substantially parallel to one another. Accordingly, in the exemplary embodiment, sidewalls 510 and 514 are substantially perpendicular to second sidewall and fourth sidewalls 516. Moreover, in the exemplary embodiment, at least some laminations 500 have a lip portion 518 extends radially outward from second sidewall and fourth sidewalls 516, respectively, such that a mounting surface (not shown in FIG. 7) is formed.

In the exemplary embodiment, each pole cap portion 504 is substantially trapezoidal in shape. In alternative embodiments, pole cap portion 504 may have any other shape, such as, but not limited to, a rectangular shape or an arcuate shape.

Specifically, each pole cap portion 504 has a contour that substantially matches a contour of stator rim (not shown).

In the exemplary embodiment, each pole cap portion 504 includes a first sidewall 530 and a second sidewall 532. First and second sidewalls 530 and 532 respectively are substantially parallel to one another. Moreover, in the exemplary embodiment, sidewall 532 has a first tapered portion (not shown in FIG. 7) that extends from sidewall 532 towards sidewall 530 and a second tapered portion 536 that extends from sidewall 532 towards sidewall 530, respectively.

In the exemplary embodiment, bridge portions 506 include rectangular bridge portions 538. In the exemplary embodiment, each rectangular bridge portion 538 includes a first sidewall 542, a second sidewall 544, and a body 546 extending therebetween. First and second sidewalls 540 and 542 respectively are substantially parallel to one another. Body 544 is in mechanical communication with base plate sidewall 510 and pole cap sidewall 530.

FIG. 7 also illustrates retaining clamp 670 configured to facilitate securing pole assembly 640 to rotor rim 18 (shown in FIG. 1). In the exemplary embodiment, each clamp 670 is substantially rectangle in shape. In alternative embodiments, clamp 670 may have any other shape, such as, but not limited to, a square shape or a trapezoidal shape. Specifically, each clamp 670 is shaped to match a corresponding base plate lip 518, bridge sidewall 544, and pole cap tapered portions 534 and 536. In the exemplary embodiment, clamp 670 is fabricated from a non-magnetic material. In one embodiment, clamp 670 is fabricated from a fiberglass/resin composite, such as, but not limited to G10 and/or G11 materials. In another embodiment, clamp 670 is fabricated from a composite including, but not limited to, electrical steel and a G10 material. In alternative embodiments, clamp 670 may be fabricated from any other suitable material that enable pole assembly 640 to function as described herein.

In the exemplary embodiment, each clamp 670 includes a first sidewall 602, a second sidewall 604, a third sidewall 606, and a fourth sidewall 608. First and third sidewalls 602 and 606 respectively are substantially parallel to one another, and second and fourth sidewalls 604 and 608 respectively are substantially parallel to one another. Accordingly, sidewalls 602 and 606 are substantially perpendicular to sidewalls 604 and 608. Moreover, in the exemplary embodiment, sidewall 602 includes a tapered portion 610 that extends from sidewall 602. In the exemplary embodiment, tapered portion 610 includes a tapered mounting surface 612.

In the exemplary embodiment, clamp sidewall 604 is configured to mechanically couple to rotor core 18 (not shown in FIG. 7) and clamp tapered portion 610 is configured to mechanically couple to pole cap tapered portion 536 such that pole assembly 640 is mechanically coupled to rotor 12 (not shown in FIG. 7). In the exemplary embodiment, a fastener (not shown) extends through a clamp aperture 614. In an alternative embodiment, the fastener extends through clamp apertures 614 into to a locking fastener (not shown) positioned with rotor core 18. Clamp 670 includes a fifth sidewall 616 and a sixth sidewall 618 extending between sidewalls 604 and 608. A recess 620 extends at least partially between sidewalls 611 and 618 respectively. Recess 620 is configured to receive and mechanically couple to base plate lip 518.

Figure 8:
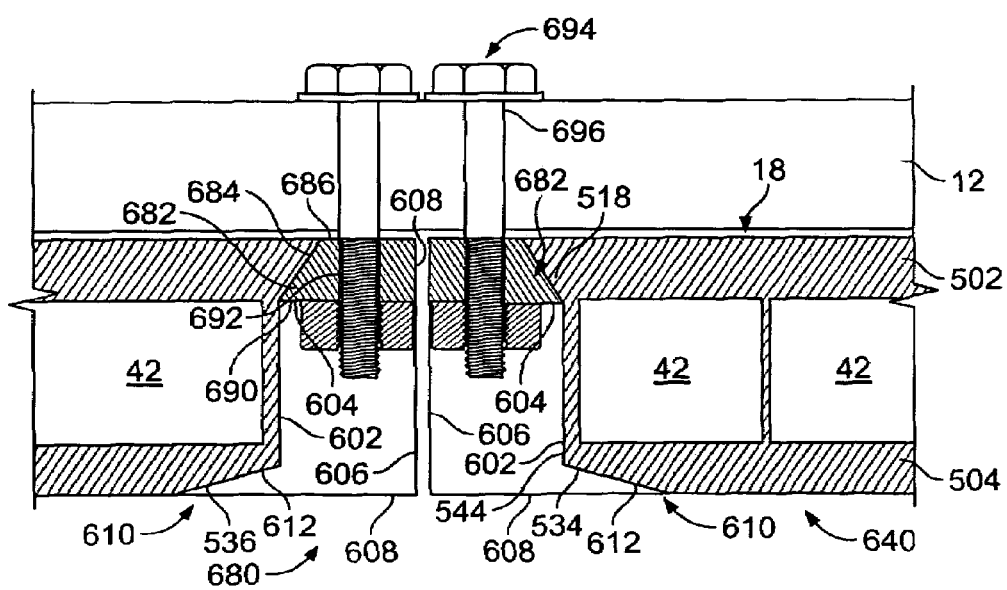
FIG. 8 is side view of a portion of a rotor core including a third embodiment of the retaining clamp shown in FIG. 6.

FIG. 8 is another embodiment of a retaining clamp 680 configured to facilitate securing pole assembly 640 to rotor rim 18. Retaining clamp 680 is substantially similar to retaining clamp 670, (shown in FIG. 7) and components retaining clamp 680 that are identical to components of retaining clamp 670 are identified in FIG. 8 using the same reference numerals used in FIG. 7.

In the exemplary embodiment, each clamp 680 is substantially rectangle in shape. In alternative embodiments, clamp 680 may have any other shape, such as, but not limited to, a square shape or a trapezoidal shape. Specifically, each clamp 680 is shaped to match corresponding base plate lips 518, bridge sidewalls 544, and pole cap tapered portions 534 and 536. In the exemplary embodiment, clamp 680 is fabricated from a non-magnetic material bonded to a laminated wedge strip 682. In one embodiment, clamp 680 is fabricated from a fiberglass/resin composite, such as, but not limited to G10 and/or G11 materials bonded to laminated electrical steel. In another embodiment, clamp 680 is fabricated from a composite including, but not limited to, electrical steel and a G11 material. In alternative embodiments, clamp 680 may be fabricated from any other suitable material that enable pole assembly 640 to function as described herein.

In the exemplary embodiment, each clamp 680 includes a first sidewall 602, a second sidewall 604, a third sidewall 606, and a fourth sidewall 608. First and third sidewalls 602 and 606 respectively are substantially parallel to one another, and second and fourth sidewalls 604 and 608 respectively are substantially parallel to one another. Accordingly, sidewalls 602 and 606 are substantially perpendicular to sidewalls 604 and 608. In the exemplary embodiment, sidewall 602 includes a tapered portion 610 that extends from sidewall 602. In the exemplary embodiment, tapered portion 610 includes a tapered mounting surface 612. Moreover, sidewall 604 includes an aperture 614.

In the exemplary embodiment, clamp 680 is coupled to laminated wedge strip 682. Specifically, clamp sidewall 604 is configured to mechanically couple to strip 682. Strip 682 includes a first sidewall 684, a second sidewall 686, a third sidewall 688, and a fourth sidewall 690. First and third sidewalls 684 and 688 respectively are substantially parallel to one another, and second and fourth sidewalls 686 and 690 respectively are substantially parallel to one another. Accordingly, sidewalls 684 and 688 are substantially perpendicular to sidewalls 686 and 690. In the exemplary embodiment, sidewall 684 tapers from sidewall 686 to sidewall 690. Moreover, strip 682 includes an aperture 692 extending between sidewalls 686 and 690.

In operation, clamp tapered portion 610 is configured to mechanically couple to either pole cap tapered portion 534 or 536 and strip sidewall 684 is configured to mechanically base plate lip 518 such that pole assembly 640 is mechanically coupled adjacent to rotor rim 18. In the exemplary embodiment, a fastener 694 extends through a rotor aperture 696 and into strip aperture 692 and clamp aperture 614. Fastener 694 into to a locking fastener 698 positioned within sidewall 604.

FIG. 9 is side view of another embodiment of rotor 12 including permanent magnet pole assembly 760. FIG. 10 is a detailed view of a first portion of rotor 12. FIG. 11 is a detailed view of a second portion of rotor 12. PM pole assembly 760 is substantially similar to pole assembly 70, (shown in FIG. 5) and components of pole assembly 760 that are identical to components of pole assembly 70 are identified in FIGS. 9-11 using the same reference numerals used in FIG. 5. In the exemplary embodiment, pole assembly 760 includes a plurality of laminations 700 and at least one permanent magnet pole 40 extending therethrough.

In the exemplary embodiment, laminations 700 are substantially similar to laminations 500 (shown in FIG. 5) except as indicated below. Specifically, laminations 700 include base plate portion 502, pole cap portion 504, and bridge portion 506 extending therebetween such that cavity 508 is defined therein. In the exemplary embodiment, base plate portion 502 includes a full-length end 702 and a truncated end 704.

In the exemplary embodiment, a lip portion 706 extends from end 702 parallel to base plate portion 502 and substantially perpendicular to bridge portion 506 and a dovetail 708 extends perpendicular to base plate portion 502. Each lip portion 706 is adjacent another pole assembly 760 and configured to engage a clamp 800. Each dovetail 708 is configured to slidably couple to a rotor rim dovetail slot 710.

End 704 includes a half dovetail 720 extending perpendicular to base plate portion 502 and configured to slidably couple to a rotor rim dovetail slot 710. Clamp 800 includes a half dovetail portion 802 configured to slidably couple to rotor rim dovetail slot 710, adjacent half dovetail 720 such that pole assembly 18 is slidably coupled to rotor rim 18.

The above-described invention provides a cost-effective and reliable method for assembling pole assemblies to facilitate reducing eddy current losses. Positioning a permanent magnet pole between laminated base plates and laminated pole caps provides several benefits. Because the laminated base plates and pole caps are fabricated from highly permeable, high axial resistivity material, they facilitate reducing eddy current losses from the top of the pole and facilitate preventing sub-harmonic flux. Additionally, unitary laminations facilitate ease of assembly of both the pole assemblies and the rotor assemblies. Furthermore, the shape of the laminations facilitates reducing cogging torque and load ripple torque.

Exemplary embodiments of pole assemblies and rotor assemblies are described above in detail. The pole assemblies are not limited to the specific embodiments described herein, but rather, components of each polar assembly may be utilized independently and separately from other components described herein. For example, each pole assembly can also be used in combination with other rotor assemblies, and is not limited to practice with only a rotor rim as described herein. Rather, the present invention can be implemented and utilized in connection with many other rotor assemblies and electric machine configurations.

While the invention has been described in terms of various specific embodiments, those skilled in the art will recognize that the invention can be practiced with modification within the spirit and scope of the claims.

What is claimed is:

1. A pole assembly suitable for use in a rotor, said pole assembly comprising:
   a permanent magnet pole formed from a plurality of permanent magnet blocks stacked together;
   a plurality of pole cap laminations, each said pole cap lamination having a first sidewall at least as long as a first dimension of said stack of permanent magnet blocks, said plurality of pole cap laminations stacked and bonded together to form a pole cap having a stack length substantially equal to a second dimension of said stack of permanent magnet blocks, said plurality of pole cap laminations mechanically coupled to a first surface of said permanent magnet pole; and
   a plurality of base plate laminations, each said base plate lamination having a first sidewall at least as long as said first dimension, said plurality of base plate laminations stacked and bonded together to form a base plate having a stack length substantially equal to said second dimension, said plurality of base plate laminations mechanically coupled to a second surface of said permanent magnet pole, said plurality of base plates laminations further including a plurality of first base plate portions having a first length and a plurality of second base plate portions having a second length.

2. A pole assembly suitable for use in a rotor, said pole assembly comprising:
   a permanent magnet pole formed from a plurality of permanent magnet blocks stacked together;
   a plurality of pole cap laminations fabricated from electrical steel material, each said pole cap lamination having a first sidewall at least as long as a first dimension of said stack of permanent magnet blocks, said plurality of pole cap laminations stacked and bonded together with a resin to form a pole cap having a stack length substantially equal to a second dimension of said stack of permanent magnet blocks, said plurality of pole cap laminations mechanically coupled to a first surface of said permanent magnet pole; and
   a plurality of base plate laminations fabricated from electrical steel material, each said base plate lamination having a first sidewall at least as long as said first dimension, said plurality of base plate laminations stacked and bonded together with a resin to form a base plate having a stack length substantially equal to said second dimension, said plurality of base plate laminations mechanically coupled to a second surface of said permanent magnet pole.

3. A pole assembly suitable for use in a rotor, said pole assembly comprising:
   a plurality of clamps mounted to the rotor, each of said plurality of clamps having a steel laminated portion bonded to a composite material portion such that said steel laminated portion is positioned adjacent the rotor;
   a permanent magnet pole formed from a plurality of permanent magnet blocks stacked together;
   a plurality of pole cap laminations, each said pole cap lamination having a first sidewall at least as long as a first dimension of said stack of permanent magnet blocks, said plurality of pole cap laminations stacked and bonded together to form a pole cap having a stack length substantially equal to a second dimension of said stack of permanent magnet blocks, said plurality of pole cap laminations mechanically coupled to a first surface of said permanent magnet pole; and
   a plurality of base plate laminations, each said base plate lamination having a first sidewall at least as long as said first dimension, said plurality of base plate laminations stacked and bonded together to form a base plate having a stack length substantially equal to said second dimension, said plurality of base plate laminations mechanically coupled to a second surface of said permanent magnet pole.

4. An electric machine comprising:
   a stator assembly;
   a rotor assembly rotatably coupled with said stator assembly, said stator assembly and said rotor assembly separated from one another by an air gap, said rotor assembly including a plurality of pole assemblies, each said pole assembly including:
      a coupling member having a non-magnetic mounting block configured to receive a fastener therethrough for securing said pole assembly to said rotor assembly;
      a bonded stack of unitary pole laminations having a base plate portion, a pole cap portion, and a bridge portion extending between said base plate portion and said pole cap portion to define a cavity, said base plate portion including a lip portion extending outward therefrom and configured to engage said coupling member, and a plurality of sintered magnet blocks stacked together within said cavity.

5. An electric machine comprising:
a stator assembly;
a rotor assembly rotatably coupled with said stator assembly, said stator assembly and said rotor assembly separated from one another by an air gap, said rotor assembly including a plurality of pole assemblies, each said pole assembly including:
  a bonded stack of unitary pole laminations having a base plate portion, a pole cap portion, and a bridge portion extending between said base plate portion and said pole cap portion to define a cavity;
  a plurality of sintered magnet blocks stacked together within said cavity; and
  a coupling member having a rotor clamp configured to secure said pole assembly to said rotor assembly, said base plate portion further including a tapered portion configured to slidably couple to said coupling member.

6. An electric machine comprising:
a stator assembly;
a rotor assembly rotatably coupled with said stator assembly, said stator assembly and said rotor assembly separated from one another by an air gap, said rotor assembly including a plurality of pole assemblies, each said pole assembly including:
  a bonded stack of unitary pole laminations having a base plate portion, a pole cap portion, and a bridge portion extending between said base plate portion and said pole cap portion to define a cavity, said base plate portion including a dovetail portion for coupling to said rotor assembly;
  a plurality of sintered magnet blocks stacked together within said cavity; and
  a coupling member having a rotor clamp configured to couple said pole assembly to said rotor assembly.

* * * * *